(12) United States Patent
Bowman-Amuah

(10) Patent No.: US 7,716,333 B2
(45) Date of Patent: May 11, 2010

(54) SERVICE CONTROL ARCHITECTURE

(75) Inventor: Michel K. Bowman-Amuah, Colorado Springs, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 945 days.

(21) Appl. No.: 10/306,979

(22) Filed: Nov. 27, 2002

(65) Prior Publication Data

US 2004/0030705 A1 Feb. 12, 2004

Related U.S. Application Data

(60) Provisional application No. 60/333,601, filed on Nov. 27, 2001.

(51) Int. Cl.
*G06F 15/173* (2006.01)

(52) U.S. Cl. ...................... 709/226; 709/223

(58) Field of Classification Search ...... 707/100–104.1; 709/212–216, 223, 224, 202
See application file for complete search history.

(56) References Cited

U.S. PATENT DOCUMENTS

| | | | |
|---|---|---|---|
| 5,539,395 A | 7/1996 | Buss et al. | |
| 5,572,582 A | 11/1996 | Riddle | |
| 5,793,762 A | 8/1998 | Penners et al. | |
| 5,852,775 A | 12/1998 | Hidary et al. | |
| 5,907,598 A | 5/1999 | Mandalia et al. | |
| 5,907,837 A | 5/1999 | Ferrel et al. | |
| 5,949,975 A | 9/1999 | Batty et al. | |
| 6,125,108 A | 9/2000 | Shaffer et al. | |
| 6,125,113 A | 9/2000 | Farris et al. | |
| 6,185,204 B1 | 2/2001 | Voit | |
| 6,275,692 B1 | 8/2001 | Skog | |
| 6,363,411 B1 * | 3/2002 | Dugan et al. | 709/202 |
| 6,366,567 B1 | 4/2002 | Singh et al. | |
| 6,377,993 B1 | 4/2002 | Brandt et al. | |
| 6,385,592 B1 | 5/2002 | Angles et al. | |
| 6,421,719 B1 * | 7/2002 | Lewis et al. | 709/224 |
| 6,425,005 B1 | 7/2002 | Dugan et al. | |
| 6,434,381 B1 | 8/2002 | Moore et al. | |
| 6,470,386 B1 | 10/2002 | Combar et al. | |

(Continued)

FOREIGN PATENT DOCUMENTS

JP 6-77958 3/1994

(Continued)

OTHER PUBLICATIONS

*Dayco* Statement Regarding Related Applications.

(Continued)

*Primary Examiner*—David E England
(74) *Attorney, Agent, or Firm*—Finnegan, Henderson, Farabow, Garrett & Dunner, LLP

(57) ABSTRACT

A system, method and computer program product are provided for affording intention-based, context-sensitive services to mobile users. First provided is a database. Also included is a profiler module coupled to the database. The profiler module is adapted for collecting a state of a user along with profile information. Such profile information includes an identity, location, available services per location, devices per location, and/or security per location. In use, the profiler module communicates the profile information to the database for storage therein.

40 Claims, 7 Drawing Sheets

U.S. PATENT DOCUMENTS

| | | | |
|---|---|---|---|
| 6,560,222 B1 | 5/2003 | Pounds | |
| 6,631,122 B1* | 10/2003 | Arunachalam et al. | 370/332 |
| 6,647,257 B2* | 11/2003 | Owensby | 455/414.1 |
| 6,732,080 B1* | 5/2004 | Blants | 705/9 |
| 6,756,918 B2 | 6/2004 | Fomukong | |
| 6,769,000 B1* | 7/2004 | Akhtar et al. | 707/103 R |
| 6,775,255 B1* | 8/2004 | Roy | 370/331 |
| 6,898,641 B1* | 5/2005 | Kobayashi | 709/238 |
| 6,920,319 B2 | 7/2005 | Knutsson et al. | |
| 6,976,087 B1* | 12/2005 | Westfall et al. | 709/238 |
| 6,996,768 B1* | 2/2006 | Elo et al. | 715/500 |
| 7,154,056 B2 | 12/2006 | Bergovist et al. | |
| 2001/0010054 A1 | 7/2001 | Orii et al. | |
| 2001/0043148 A1 | 11/2001 | Stewart | |
| 2002/0007400 A1* | 1/2002 | Pedersen | 709/206 |
| 2002/0077121 A1* | 6/2002 | Ketola | 455/456 |
| 2002/0176579 A1* | 11/2002 | Deshpande et al. | 380/270 |
| 2003/0055977 A1 | 3/2003 | Miller | |
| 2003/0063072 A1 | 4/2003 | Bradenberg et al. | |
| 2003/0069693 A1* | 4/2003 | Snapp et al. | 701/213 |
| 2004/0030749 A1* | 2/2004 | Bowman-Amuah | 709/204 |
| 2004/0205153 A1* | 10/2004 | Weisshaar et al. | 709/217 |
| 2005/0080665 A1* | 4/2005 | Bowman-Amuah | 705/14 |

FOREIGN PATENT DOCUMENTS

| | | |
|---|---|---|
| WO | WO98/38814 | 9/1998 |
| WO | WO98/59503 | 12/1998 |
| WO | WO 99/03050 | 1/1999 |
| WO | WO 00/23864 | 4/2000 |
| WO | WO00/23864 | 4/2000 |
| WO | WO00/35216 | 6/2000 |
| WO | WO 00/46713 | 8/2000 |
| WO | WO 00/62564 | 10/2000 |
| WO | WO00/77978 | 12/2000 |
| WO | WO 01/22198 | 3/2001 |
| WO | WO 01/22748 | 3/2001 |
| WO | WO01/76170 | 10/2001 |
| WO | WO01/76173 | 10/2001 |
| WO | WO01/89189 | 11/2001 |
| WO | WO 01/98936 | 12/2001 |

OTHER PUBLICATIONS

Suryanarayana, L. et al., "CC/PP for Content Negotiation and Contextualization" Lecture Notes in Computer Science, Springer Verlag, New York, NY, US, vol. 1987, Jan. 8, 2001, pp. 239-245, XP001086530, ISSN: 0302-9743.

McDysan, D. et al. "Multiservice Networking Using a Component-Based Switch and Router Architecture" Proceedings of the IEEE Conference 2000 on High Performance Switching and Routing. Heidelberg, Germany, Jun. 26-29, 2000, Proceedings of the IEEE Conference on High Performance Switching and Routing, New York, NY: IEEE, US, Jun. 26, 2000, pp. 97-104, XP001075691 ISBN: 0-7803-5884-8.

Low, C., "Integrating Communication Services" IEEE Communications Magazine, IEEE Service Center, New York, NY, US. vol. 35, No. 6, Jun. 1997, pp. 164-169, XP000659204 ISSN: 0163-6804.

Deserres, Y. et al. "Value-Added Services in the Converged Network" IEEE Communications Magazine, IEEE Service Center, New York, NY, US. vol. 39, No. 9, Sep. 2001, pp. 146-154, XP001107762 ISSN: 0163-6804.

Office Action issued Dec. 3, 2007 by EPO on European Application No. 02 789 915.2-1238.

Office Action issued on Jan. 14, 2008 by US PTO on U.S. Appl. No. 10/307,142.

Office Action issued on Jan. 24, 2008 by US PTO on U.S. Appl. No. 10/647,411.

Office Action issued Jan. 30, 2008 by EPO enclosing supplementary European Search Report on Application No. 02786819.9-1244.

Examination Report issued May 19, 2008 by the EPO on Application No. 02 784 643.5-1238.

Office Action issued on Jul. 21, 2008 by US PTO on U.S. Appl. No. 10/647,411.

Office Action, dated Sep. 4, 2008, for U.S. Appl. No. 10/307,142, filed Nov. 27, 2002 (12 pages).

Advisory Action, dated Mar. 27, 2008, for U.S. Appl. No. 10/307,142, filed Nov. 27, 2002 (3 pages).

Office Action, dated Aug. 1, 2007, for U.S. Appl. No. 10/307,142, filed Nov. 27, 2002 (9 pages).

Office Action, dated Feb. 14, 2007, for U.S. Appl. No. 10/307,142, filed Nov. 27, 2002 (11 pages).

Office Action, dated Jun. 19, 2006, for U.S. Appl. No. 10/307,142, filed Nov. 27, 2002 (8 pages).

Office Action, dated Jan. 29, 2009, for U.S. Appl. No. 10/647,411, filed Aug. 25, 2003 (7 pages).

Office Action, dated May 30, 2007, for U.S. Appl. No. 10/647,411, filed Aug. 25, 2003 (6 pages).

Office Action, dated Oct. 4, 2006, for U.S. Appl. No. 10/647,411, filed Aug. 25, 2003 (7 pages).

Office Action, dated Jan. 25, 2006, for U.S. Appl. No. 10/647,411, filed Aug. 25, 2003 (6 pages).

Office Action, issued by EPO on Jan. 16, 2006 for European Appl. No. 02789915.2, enclosing Supplementary European Search Report (5 pages).

PCT Written Opinion, dated Jun. 7, 2006, for International Appl. No. PCT/US02/38137 (7 pages).

PCT International Preliminary Examination Report, dated Jun. 18, 2007, for International Appl. No. PCT/US02/38137 (8 pages).

PCT International Preliminary Examination Report, dated Feb. 27, 2004, for International Appl. No. PCT/US02/38138 (5 pages).

Advisory ACtion, dated Apr. 16, 2009, for U.S. Appl. No. 10/647,411, filed Aug. 25, 2003 (3 pages).

* cited by examiner

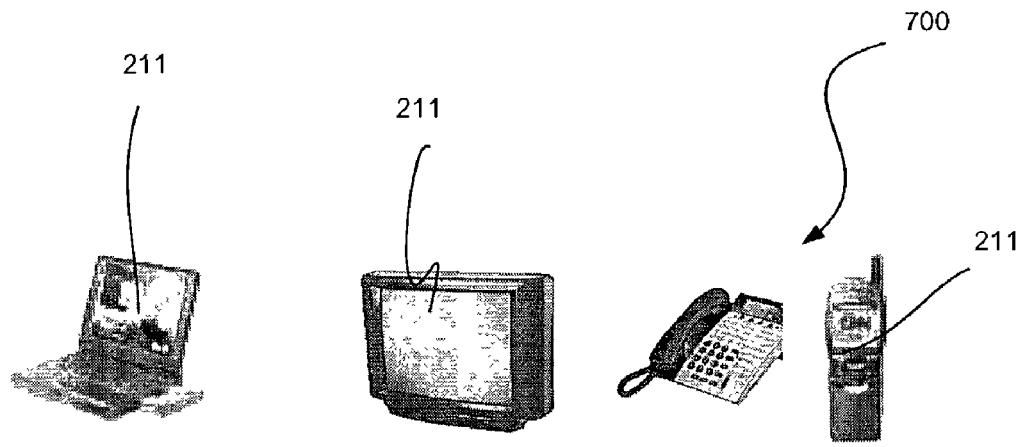

Sample Profiles/Config:
Security Keys
Service Configuration
User Information
Address Information

Sample Policies/Rules:
ACLs
Encryption Algorithms
Resource Allocation (QoS)
Roaming Policy
Supported Services
Credit limits

Sample Resource/State:
Current Bandwidth/Latency
Network/Service Performance

Presence/Location:
Roaming Location
Address Mapping/Binding
State of Device (on/off)

Sample Profiles/Config:
Favorite Channels
User Information
Resolution (HDTV)
Pricing/rates

Sample Policies/Rules:
Subscribed Channels
ACLs.
No "R" Movies w/o Password
No Access to MTV Channel

Sample Resource/State:
Available Channels
Network/Service Performance

Presence/Location:
State of Device (on/off)
Tailored services to current
selected channel

Sample Profiles/Config:
Dial Plans
User Information
Vocoding algorithms
Supported features

Sample Policies/Rules:
Subscribed Features
ACLs·
No 3 way International Calling
No acceptance of collect calls
No "900" calls

Sample Resource/State:
Intelligent call/message
handling
Network/Service Performance

Presence/Location:
State of Device (on/off)
Address Mapping/Binding
Tailored services to current
area (e.g local restaurants,
time based call barring, etc.)

Figure 7

SERVICE CONTROL ARCHITECTURE

RELATED APPLICATIONS

This application is related to co-pending applications entitled "SERVICE CONTROL FRAMEWORK FOR SEAMLESS TRANSFER OF A MULTIMEDIA CONFERENCE OVER DIFFERENT MEDIA" and "CONTEXT SENSITIVE ADVERTISEMENT DELIVERY FRAMEWORK" which are each invented by Michel K. Bowman-Amuah and filed concurrently herewith under Ser. Nos. 10/307,142 and 10/307,120, respectively, and which are incorporated herein by reference in their entirety for all purposes.

FIELD OF THE INVENTION

The present invention relates to network service control, and more particularly to controlling network resources for enabling advanced services.

GENERAL BACKGROUND AND STATE OF THE ART

Invention Summary

The Internet basically comprises several large computer networks joined together over high-speed data links ranging from ISDN to T1, T3, FDDI, SONET, SMDS, OT1, etc. In simplified fashion the Internet may be viewed as a series of routers connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

Referring to prior art FIG. 1, there is shown a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs are shown in FIG. 1 at 110, 112 and 114. The Autonomous Systems (ASs) are linked by Inter-AS Connections 111, 113 and 115. Information Providers (IPs) 116 and 118, such as America Online (AOL) and Compuserve, are connected to the Internet via high speed lines 120 and 122, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and MicroSoft (MSN) is an IP using UUNET as an ISP. Other information providers, such as universities, are indicated in exemplary fashion at 124 and are connected to the AS/ISPs via the same type connections here illustrated as T1 lines 126. Corporate Local Area Networks (LANs), such as those illustrated in 128 and 130, are connected through routers 132 and 134 and high speed data links such as T1 lines 136 and 138. Computers 140 and 142 are representative of computers connected to the Internet via the public switched telephone network (PSTN) and are shown connected to the AS/ISPs via dial up links 144 and 146. As an option, cellular technology may be used to establish such dial up links 144 and 146.

A multitude of services are currently being offered over the Internet. Unfortunately, however, the Internet fails to provide much intelligence for affording advanced service control. Without such intelligence, services over the Internet are often limited.

In sharp contrast, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via the CCIS link. The network offices then use the call control message to complete the particular call.

In our increasingly mobile society, there is an ever increasing demand for mobile communications which allow a person to roam freely while making and receiving telephone calls from virtually any location. Further, there is a progressing need for advanced Internet services while roaming freely and receiving/making telephone calls from various locations. There is thus a need to incorporate the principles of AIN with next generation networks including the Internet.

A system, method and computer program product are provided for affording intention-based, context-sensitive services to mobile users. First provided is a database. Also included is a profiler module coupled to the database. The profiler module is adapted for collecting a state of a user along with profile information. Such profile information includes an identity, location, available services per location, devices per location, and/or security per location. In use, the profiler module communicates the profile information to the database for storage therein.

Also included is an application module coupled to the database. The application module includes a plurality of application program interfaces for interfacing with a plurality of applications. The application module is adapted for allocating application resources to the applications utilized by a user based on the corresponding profile information stored in the database.

Associated therewith is a network resource module coupled to the database and a plurality of network routers. The network resource module serves for configuring the network routers based on the profile information stored in the database and the application resources allocated to the applications. Also coupled to the database is a presentation module adapted for tailoring an output of the applications based on the profile information.

A policy server is coupled to the database, the application module, the network resource module, and the presentation module for controlling the operation thereof in accordance with policies identified utilizing the profile information.

In one embodiment, services provided by the present system may include Internet Protocol/Virtual Private Network (IP/VPN) services, Third Generation (3G) Wireless services, Voice over Internet Protocol (VoIP) services, and/or Application Service Provider (ASP) services. Further, the database may include a directory schema. Still yet, the directory schema may include an object-oriented structure. The directory schema may also identify a logical relationship between the user, devices utilized by the user, services associated with the user, and functionality of the services.

In another embodiment, the profile information may include service attributes associated with the user. Such service attributes may indicate a type and/or class of service associated with the user. Still yet, the profiler module may be executed on a portal server for collecting the profile information. In use, the application module may allocate the application resources based on the service attributes collected by the profiler module. As an option, the application module may include JAVA code.

In still yet another embodiment, the application program interfaces of the application module may be adapted to interface a first application with a second application. Further, the network resource module may be written in a scripting language. Still yet, the presentation module may include directory interfaces for interfacing the directory schema, and style sheets executed on a portal server. In use, the presentation module may manage a plurality of presentation views (i.e. fonts, colors, etc.) that are utilized to tailor the output of the applications based on the profile information.

BRIEF DESCRIPTION OF THE DRAWINGS

Prior art

FIG. 7 illustrates a plurality of exemplary policies associated with various specific devices.

DETAILED DESCRIPTION OF THE PREFERRED EMBODIMENTS

Figure 1:
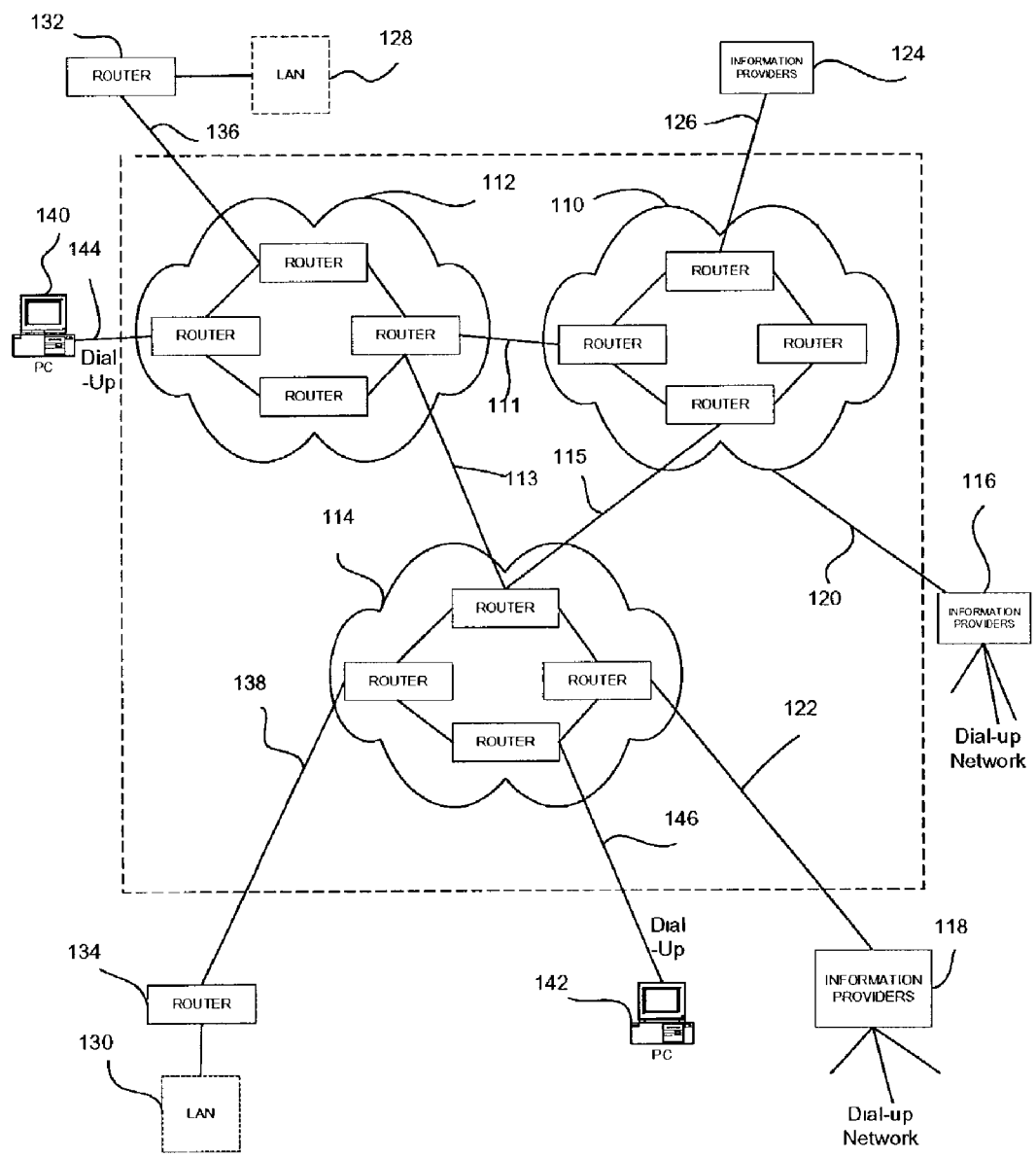
FIG. 1 shows a simplified diagram of the Internet and various types of systems typically connected thereto.
Figure 2:
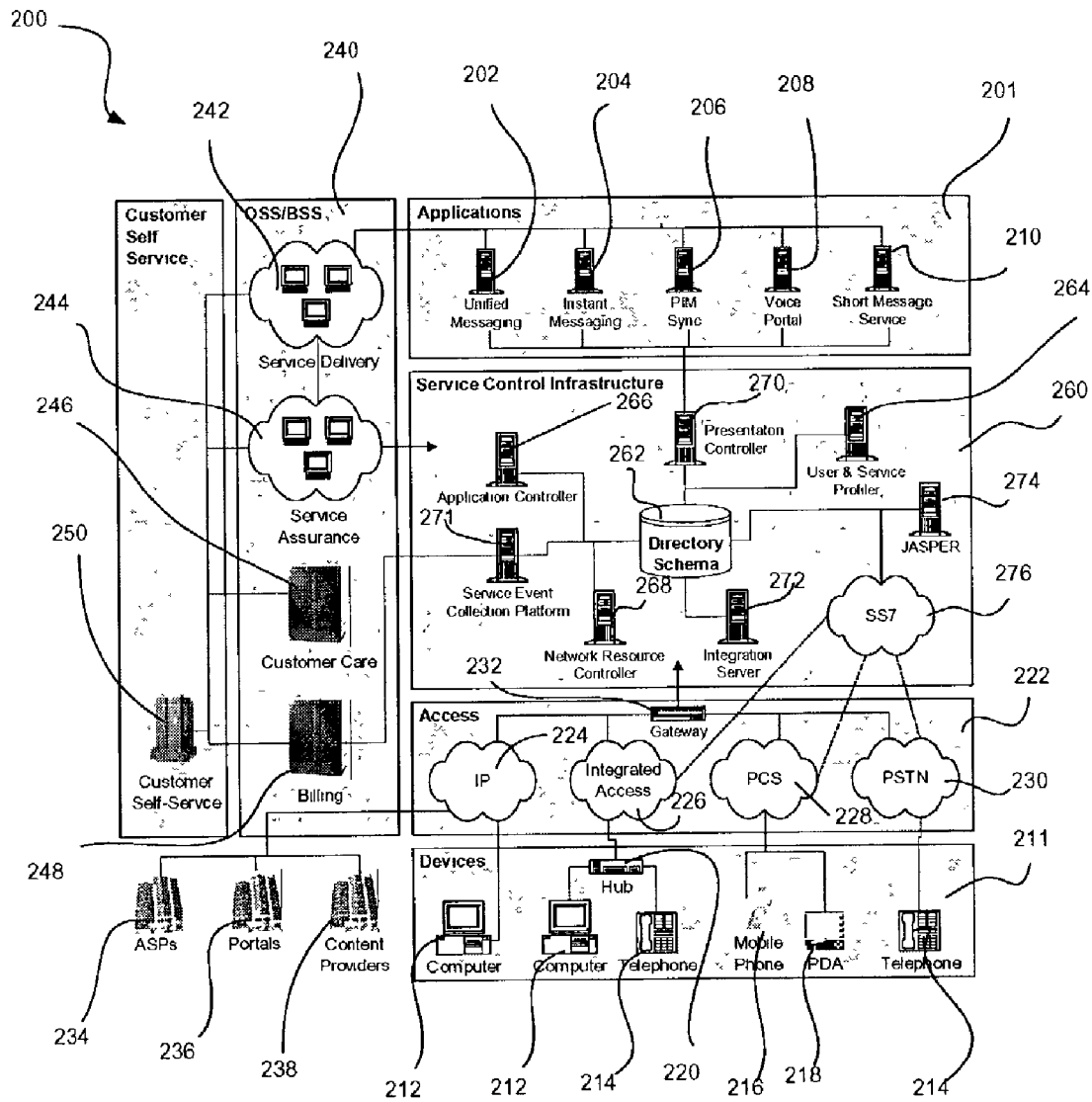
FIG. 2 illustrates a service control architecture environment, in accordance with one embodiment.

FIG. 2 illustrates a service control architecture environment 200, in accordance with one embodiment. As shown, a plurality of applications 201 are provided including a unified messaging application 202, instant messaging application 204, PIM Sync application 206, voice portal application 208, and short message service application 210. Of course, any other desired applications may be provided per the desires of the user.

Further provided is a plurality of devices 211 including computers 212, telephones 214, and mobile devices such as mobile phones 216, personal digital assistants 218 (PDAs), etc. Some of such devices 211 may be coupled via a hub 220. Coupled to the devices 211 is a plurality of access networks 222. The access networks 222 include a Internet Protocol (IP) network 224, an integrated access network 226, personal communication services (PCS) network 228, and a public switched telephone network (PSTN) 230.

Each of the access networks 222 is in turn coupled to a gateway 232. Also provided is a plurality of application service providers (ASPs) 234, portals 236, and content providers 238 which are coupled to the Internet Protocol (IP) network 224.

With continuing reference to FIG. 2, a plurality of Business Support Systems and Operations Support Systems (OSS/BSS) 240 are included. In particular, the OSS/BSS 240 include a service delivery system 242 coupled to the applications 201 and a service assurance system 244 coupled thereto. The OSS/BSS 240 also include a customer care system 246 and a billing system 248. Each of the OSS/BSS 240 is coupled to a customer self-service system 250.

Next provided is a service control architecture 260 for providing intention-based, context-sensitive services to mobile users in the context of the service control architecture environment 200. First provided is a database 262. Also included is a profiler module 264 coupled to the database 262. As will become apparent, the profiler module 264 is adapted for collecting a state of a user along with profile information. Such profile information includes an identity, location, available services per location, devices per location, and/or security per location. In use, the profiler module 264 communicates the profile information to the database 262 for storage therein.

Also included is an application module 266 coupled to the database 262. The application module 266 includes a plurality of application program interfaces for interfacing with the applications 201 via the database 262. The application module 266 is adapted for allocating application resources to the applications 201 based on the profile information stored in the database 262 in a manner that will be set fort hereinafter in greater detail.

Associated therewith is a network resource module 268 coupled to the database 262 and a plurality of network routers (not shown). The network resource module 268 serves for configuring the network routers based on the profile information stored in the database 262 and the application resources allocated to the applications 201. Also coupled to the database 262 is a presentation module 270 which is in turn coupled to the applications 201. In use, the presentation module 270 is adapted for tailoring an output of the applications 201 based on the profile information.

Coupled to the billing system 248 of the OSS/BSS 240 and the database 262 is a service event collection platform 271 for tracking various events in the service control architecture environment 200 via the database 262. Such events may then be aggregated, correlated, etc. for transmission to the billing system 248 for billing purposes. Also provided is an integration server 272.

A policy server 274 is coupled to the database 262 and a Signal System 7 (SS7) network 276, the application module 266, the network resource module 268, and the presentation module 270 for controlling the operation thereof in accordance with policies identified utilizing the profile information.

The service control architecture 260 thus communicates with the OSS/BSS 240, the access networks 222 and the devices 211 via the gateway 232. Further, the service control architecture 260 communicates with the applications 201 via the presentation controller 270, and the billing system 240 via the service event collection platform 271. By this design, the service control architecture 260 serves as a hub for the service control architecture environment 200 for providing Artificial Intelligent Networks (AIN)-like capabilities in an environment including a wide range of networks 222 and devices 211.

Figure 3:
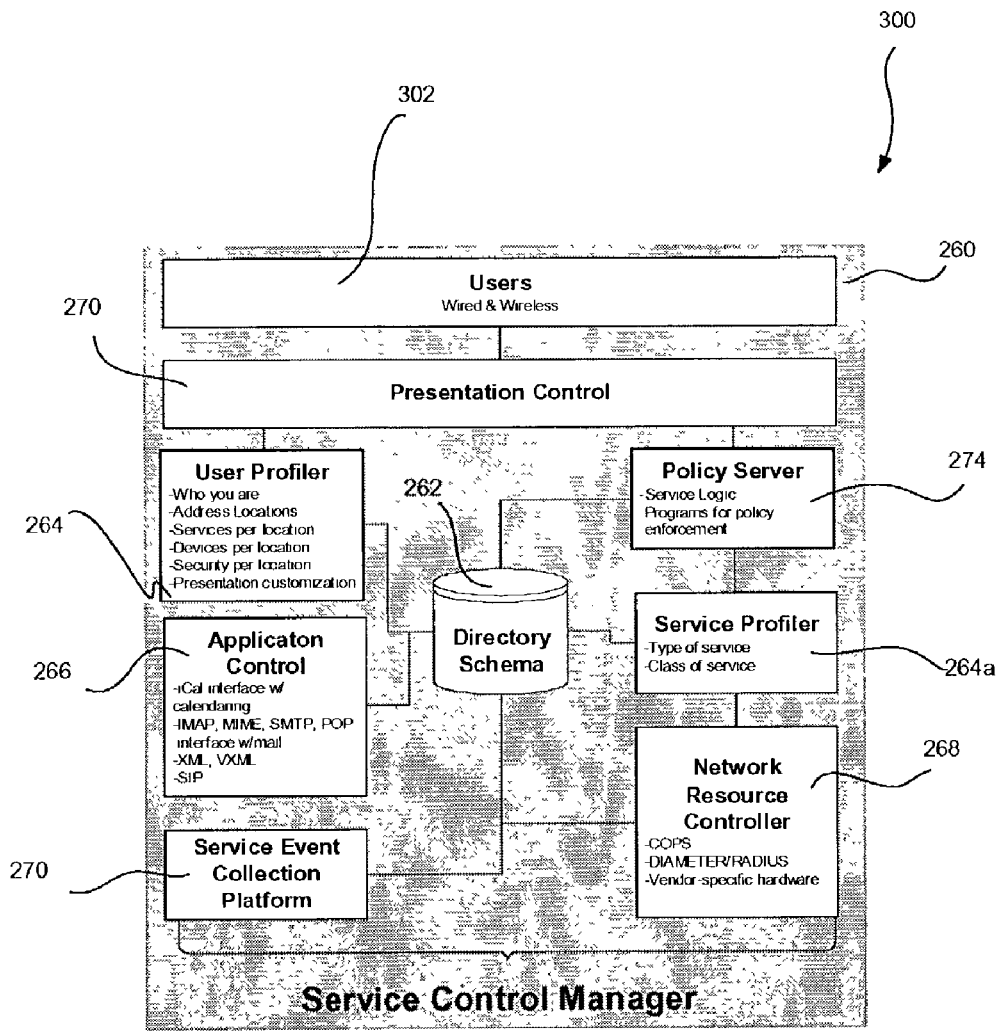
FIG. 3 illustrates a detailed overview of the service control architecture and the related services associated with each of the modules thereof.

FIG. 3 illustrates a detailed overview 300 of the service control architecture 260 and the related services associated with each of the modules thereof. Each of such modules is coupled to a plurality of users 302 utilizing the devices 211 of FIG. 2. In one embodiment, the database 262 is codified based on JAVA and/or JNDI. The database 262 provides a common data model that represents the logical relationship and data hierarchy between the users 302 and his/her services, devices and the features and functionality associated with such services. In use, the database 262 may be used to manage a user's Quality of Service (QoS), personalization and security on a per-service basis.

The profiler module 264 may include a user profiler 264 and a service profiler 264a. The profiler module 264 is adapted for collecting a state of a user along with profile information. Such profile information includes an identity, location, available services per location, devices per location, and/or security per location. The profile information may further include presentation customization for a particular user. In one embodiment, the profiler module 264 includes a data entry I/O front end application written using JAVA code. As an option, the profiler module 264 may run on a portal server (i.e. iPlanet™, etc.) that collects information and stores the same in the database 262.

As mentioned earlier, associated with the profiler module 264 is a service profiler 264a. The service profiler 264a is adapted for evaluating input and updating service attributes for a type of service [i.e. IP telephony (voice, fax over IP, etc.); IP/VPN unified messaging; calendaring; etc.] and a class of service (i.e. platinum, gold, silver, etc.). Table 1 illustrates a plurality of types of services, while Table 2 sets forth various classes of services.

TABLE 1

| | |
|---|---|
| Conversational: | (Bi-directional communication Two Parties) Messaging Content Broadcast (Uni-directional) ASP Application Service Provider CAC (Conferencing & Collaboration) TAG (Text & Graphics) |
| Converse: | Telephone, Video, Instant Messaging |
| Message: | Voice Msg, Text Msg, VideoMsg, Graphics (Uni-directional) |
| Content Broadcast: | Point to Multipoint, Unicast |
| ASP: | Client Server Application (Bi-directional Computing) |
| CAC: | Voice, Video, White boarding - Net Meeting type app. (Min 3 Participants - Bi-Directional) |
| TAG: | Text and Graphics (E-Mail apps) |

TABLE 2

| | |
|---|---|
| Example: | Platinum, Gold, Silver, and Bronze etc. |
| Quantitative: | (Bandwidth amount and type, Security on or off) |
| Qualitative: | Latency, Dropped packets, Min, Max and Sustained rate, Jitter etc. |

Service attributes may be used to define application and network resources required per service type and class of service. In use, the profiler module 264 and the service profiler 264a communicate the user and service profile information to the database 262 for storage therein.

The application module 266 includes a plurality of application program interfaces for interfacing with the applications 201 via the database 262. The application module 266 may be written using JAVA (JNDI)-based code that allocates application resources using the application program interfaces. Table 3 illustrates examples of application specific interfaces that may be associated with the application module 266.

TABLE 3 iCal to communicate with calendaring;
iMAP, MIME, SMTP, POP, to communicate with mail;
TAPI to communicate with computer telephony applications;
XML to communicate with XML data sources; and
VXML for voice XML.

The application module 266 is thus adapted for allocating application resources to the applications 201 based on the profile information (i.e. the service attributes, etc.) stored in the database 262 in a manner that will be set fort hereinafter in greater detail.

The network resource module 268 may include a Nortel® scripting language on a Shasta® platform. In use, the network resource module 268 communicates with network routers to configure parameters aligned to the profile information stored in the database 262 and the application resources allocated to the applications 201. It should be noted that the network resource module 268 is further capable of implementing and enforcing the service policies to which the user has subscribed. Still yet, the network resource module 268 can dynamically allocate bandwidth based on the stored profile information.

The presentation module 270 may optionally include Java (J2EE) code with directory APIs as well as HTML and XML style sheets running on a server (i.e. iPlanet™ server, regular server, etc.). By managing channels of content and views of presentation that a user has profiled in the directory, the presentation module 270 is adapted for tailoring an output of the applications 201 based on the profile information. In particular, the presentation module 270 may be utilized to implement requests made by the user such as content channel requests (i.e. sports, stocks, news, etc.) or views (color, fonts, etc.).

Table 4 illustrates a matrix of managed attributes and exemplary implementation details associated with the application module 266, network resource module 268, and presentation module 270 for specifically enhancing Quality of Service, security, and personalization.

TABLE 4

| | | QoS | Security | Personalization |
|---|---|---|---|---|
| Network | | 1. Bandwidth Latency Jitter Traffic Shaping Traffic Prioritization | 3. Access Control Lists Firewalls Proxy Servers Logging 4. Planet ® Directory Access | 5. Time-Of-Day Routing Bandwidth-On-Demand 6. Policy Server |

TABLE 4-continued

|  | QoS | Security | Personalization |
|---|---|---|---|
|  | 2. Orchestream ®<br>Allot<br>Communications ®<br>Preside ® Policy Server | Router<br>Narus ® - SECP for<br>logging | development effort |
| Application | 7. CPU<br>Disk Space<br>User Priority<br>Server Optimization &<br>Tuning<br>Transaction<br>Performance<br>8. CompuWare ®<br>SUN ®<br>Halcyon ®<br>DirecTools ®<br>iPlanet ® APPServer<br>Console | 9. Authentication/PKI<br>Session Security<br>Encryption<br>User Administration<br>10. iPlanet ® Portal Server<br>iPlanet ® Certificate<br>Management System<br>enTrust ® getAccess | 11. Look & Feel<br>12. Halcyon ®<br>iPlanet ®<br>APPserverConsole<br>Custom Application<br>programming |
| Presentation | Esual ®<br>iPlanet ®<br>Wireless<br>WOKUP ®<br>OpenWave ® | 13. Registration/Identification<br>Single Sign-on<br>14. iPlanet ® Portal Server<br>Netegrity ® SiteMinder ® | 15. Customized channel<br>Personalized content<br>Look & Feel<br>16. iPlanet ®<br>Portal Server<br>iPlanet ®<br>Wireless Portal |

The policy server 274 includes a service logic execution program (i.e. JAVA-based) that executes the policies associated with each individual service. In one exemplary implementation, the policy server 274 may be executed in two parts: 1) Shasta® box for network resource module 268 and 2) iPlanet® for application and presentation modules 266 and 270. In use, service control by the policy server 274 provides quality of service (QoS) and class of service (CoS); personalization and contextualization; and security through use of a user-defined policy; a directory; and authentication, authorization, and access control; respectively.

Figure 4:
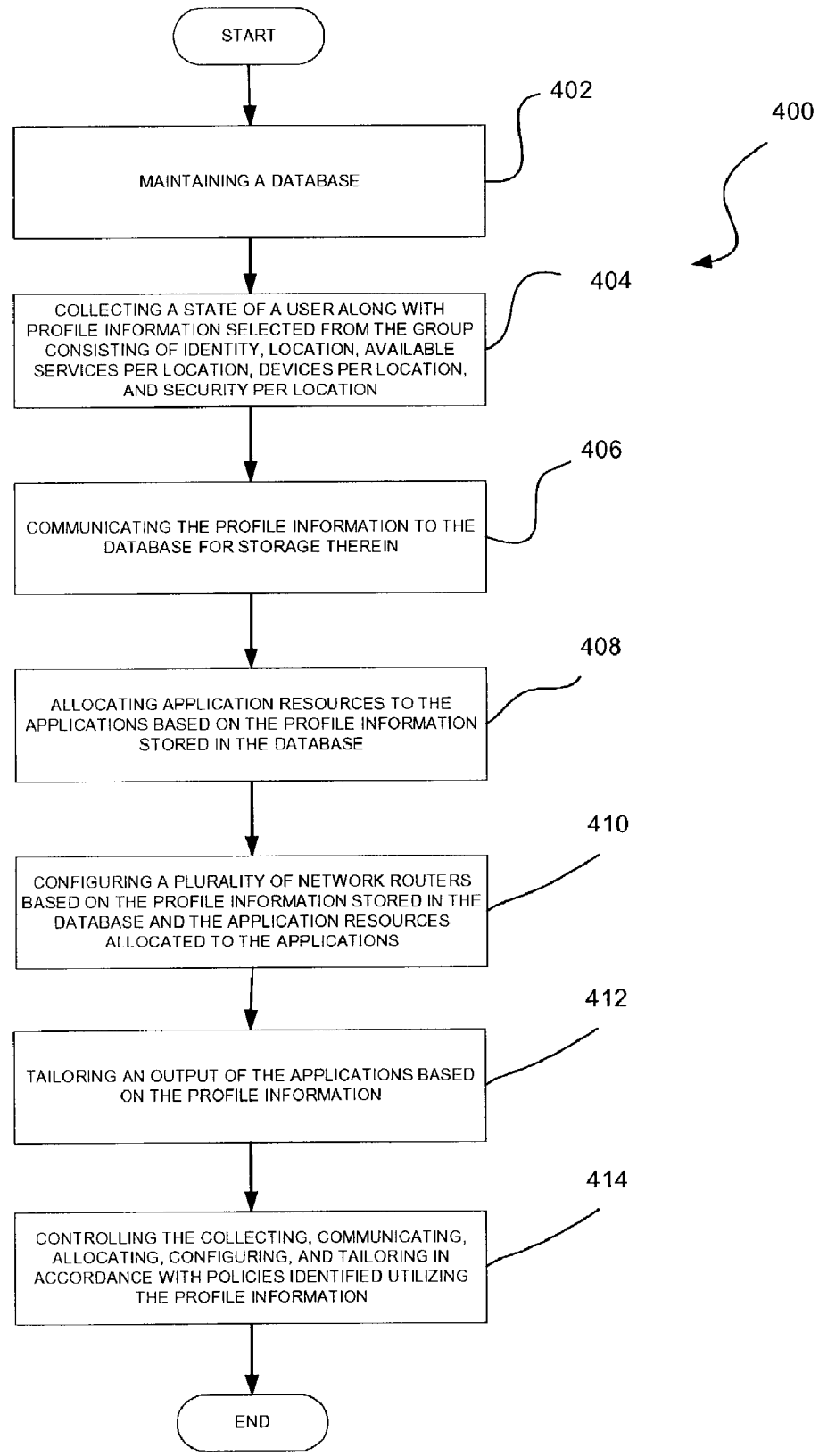
FIG. 4 illustrates a method for providing context-sensitive services, in accordance with one embodiment.

FIG. 4 illustrates a method 400 for providing context-sensitive services, in accordance with one embodiment. As shown, the database 262 is maintained in operation 402. Next, in operation 404, a state of a user is identified along with profile information. Such profile information is then communicated to the database 262 for storage therein, as indicated in operation 406.

Application resources may then be allocated to the applications based on the profile information stored in the database 262. Note operation 408. Thereafter, in operation 410, a plurality of network routers may then be configured based on the profile information stored in the database and the application resources allocated to the applications. An output of the applications is then tailored based on the profile information, as indicated in operation 412. During use, the collecting, communicating, allocating, configuring, and tailoring operations may be controlled in accordance with policies identified utilizing the profile information. See operation 414.

The service control architecture 260 is thus tightly integrated with network elements to provide intentions-based, context-sensitive services to mobile devices and users. By this design, the service control architecture 260 affords ubiquitous connectivity and data accessibility to enable the transfer of a single application session across varying access methods, and applications. The need for the aggregation of various wireless/wireline technologies and information is thus fulfilled to enable intelligent services.

Examples of enabled services include location-based services that open new content delivery possibilities [i.e. voice, audio, video (moving video), fax, static text and graphics (STAG)] while providing customers with increased levels of personalization (i.e. security level, features, bundles, language). Further provided is a personal services environment that enables personalization of services via user preferences and service profiles. Policy-based delivery provides intelligent, policy-driven delivery of services, while session control provides the ability to transfer a user's active session across devices, QoS boundaries, and physical locations.

In one embodiment, conventional services are provided and enhanced by the service control architecture 260. For example, such services may include Internet Protocol/Virtual Private Network (IP/VPN) services, Third Generation (3G) Wireless services, Voice over Internet Protocol (VoIP) services, and/or Application Service Provider (ASP) services. More information regarding such services and the manner in which they are improved by the service control architecture 260 will now be set forth.

Virtual Private Networks (VPNs) typically provide connectivity deployed on a shared infrastructure with the same Quality of Service (QoS), security, and policies as a private network. IP/VPN extends these VPN capabilities to networks based on Internet protocol (IP). Personalization and self-service may be provided in IP/VPN services via the service control architecture 260 through use of portals, policies, and directories. Further, quality of service (QoS) is provided via the integration of network elements using the network resource module 268. This may be accomplished, for example, by dynamically allocating bandwidth based on a user's profile. Still yet, the service control architecture 260 controls the security policy and delivers authentication, access control, data integrity, and encryption.

ASPs traditionally host, deploy, and manage a software application service in a rental model for multiple customers. Application Infrastructure Providers (AIPs) deploy and manage the infrastructure and hosting services to ASPs and independent software vendors. In the context of the service control architecture 260, a personal services environment is delivered for customer self-service, activation, & control. The service control architecture 260 manages session control by transferring a user's active application session across terminal types and QoS boundaries. Further, the collection platform 271 tracks service delivery events, where such information may be used by BSS/OSS 240 (i.e. Billing, service level agreement (SLA) management, etc.). Further, the service control architecture 260 provides single sign-on across subscribed services.

Unified communications conventionally act as a "hub" for various types of messages and communications technologies. Such communications bring together e-mail, instant messaging, short message service, paging, voicemail, multimedia and fax into a single user interface. Services delivered are typically independent of device type, location, and communications medium. In such environment, the service control architecture 260 provides a single point of access to various message types (i.e. voice, text, fax, streaming video, etc.) Further, all messages may be accessed and read from a single interface, while such messages are prioritized based on user defined criteria. Still yet, the service control architecture 260 serves to prevent unauthorized access, use, and hacking/misuse of a system, while determining and managing the device (i.e. PDA, PC, etc.) and connection type (i.e. DSL, mobile digital, etc.) accessing the messages.

Wireless technology traditionally involves cellular telephones which are primarily intended for speech and not particularly good for delivering data. Enhancements to existing 2nd generation systems have allowed data to be carried more easily and at higher rates. The next generation of cellular telephony (3G) has been designed to carry packet data. The service control architecture 260 forms the basis for separating the signaling and control of applications and services from the delivery channel. Further, QoS assurance is provided along with network resource management and adoption, context-sensitive applications, and service and information delivery services. The service control architecture 260 allows full exploitation of high data rates, a packet data transport medium, device-specific features and network capabilities. Multimedia traffic is supported over a packet network and high data rates are ensured for next generation wireless services.

Figure 5:
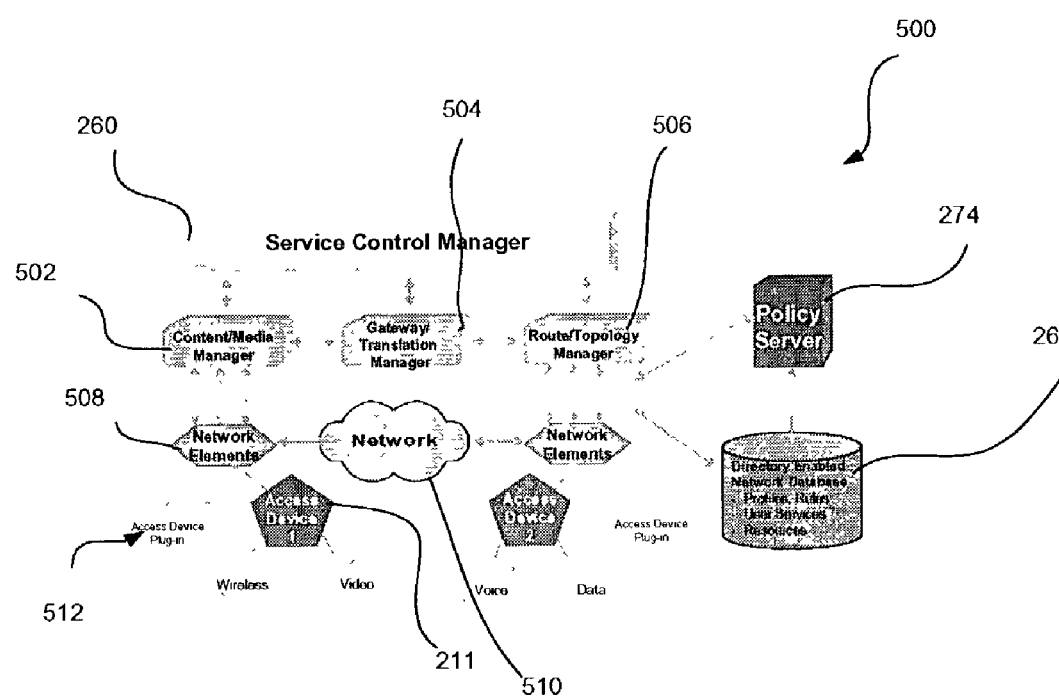
FIG. 5 illustrates one intelligent network environment in which the service control architecture may be employed, in accordance with one embodiment.

FIG. 5 illustrates one intelligent network environment 500 in which the service control architecture 260 may be employed, in accordance with one embodiment. As shown, the service control architecture 260 may be coupled to a content/media manager 502, a gateway/translation manager 504, and a route/topology manager 506. The content/media manager 502 and the route/topology manager 506 are in turn coupled to network elements 508 (i.e. routers) which are in turn coupled to a network 510, i.e. the Internet.

Coupled to the network elements 508 is the policy server 274 and database 262 which are capable of communicating via Common Open Policy Service Protocol (COPS) or any other desired protocol. Also coupled to the network elements 508 is a plurality of the devices 211. As an option, the devices 211 may be equipped with plug-ins 512. The service control architecture 260 thus provides the backbone of the intelligent network environment 500 by acting as the controller of the execution architecture that enables dynamic management and control of applications and services.

Figure 6:
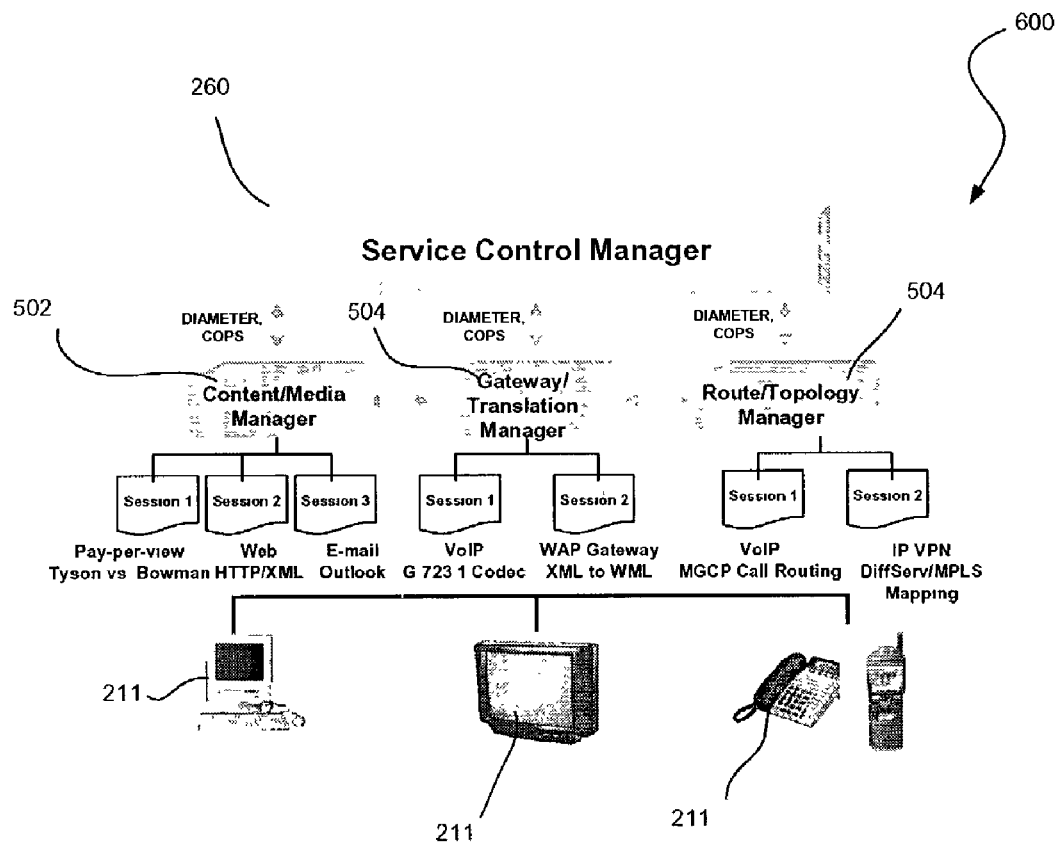
FIG. 6 illustrates the manner in which multiple sessions may be administered in the environment of FIG. 5.

FIG. 6 illustrates the manner 600 in which multiple sessions may be administered in the environment 500 of FIG. 5. The service control architecture 260 delivers services by instantiating, binding, coordinating, and managing atomic, multi-layered functions into a federated service based on user profile, service definition, policy information, current resource allocation, and resource state. As shown in FIG. 6, various sessions are executed over multiple devices 211. It should be noted that such sessions are managed by way of the policy server 274 which implements various policies. FIG. 7 illustrates a plurality of exemplary policies 700 associated with various specific devices 211.

It should be noted that many well known techniques may be utilized to improve the performance and QoS in the context of the present embodiment. For example, allocation of bandwidth may be optimized using techniques such as reservation protocol (RSVP). Further, packets may be prioritized using differentiated services (DiffServ). Still yet, paths may be created using techniques such as multi-protocol label switching (MPLS).

The present embodiment may be used in the context of various applications. For more information on such applications, reference may be made to co-pending applications entitled "SERVICE CONTROL FRAMEWORK FOR SEAMLESS TRANSFER OF A MULTIMEDIA CONFERENCE OVER DIFFERENT MEDIA" and "CONTEXT SENSITIVE ADVERTISEMENT DELIVERY FRAMEWORK" which are each invented by Michel K. Bowman-Amuah and filed concurrently herewith under Ser. Nos. 10/307,142, and 10/307,120, respectively, and which are incorporated herein by reference in their entirety for all purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

While the specification describes particular embodiments of the present invention, those of ordinary skill can devise variations of the present invention without departing from the inventive concept.

I claim:

1. A service control system for providing intention-based, context-sensitive services to mobile users, comprising:

a database;

a profiler module coupled to the database, wherein the profiler module:

collects a state of a user along with profile information including identity, location, available services per location, devices per location, and security per location, evaluates inputs related to the profile information to create an evaluation, updates the profile information to include the evaluation, updates attributes in the profile information for a type of service including telephony, messaging, and calendaring, updates attributes in the profile information for a selected service class related to an amount of service, and communicates the updated profile information to the database for storage therein;

an application module coupled to the database and including a plurality of application program interfaces for interfacing with a plurality of applications, the application program interfaces including telephony, messaging, and calendaring interfaces, wherein the application module is adapted for allocating application resources to the applications based on the updated profile information stored in the database;

a network resource module coupled to the database and a plurality of network routers, the network resource module adapted for configuring the network routers based on the updated profile information stored in the database and the application resources allocated to the applications;

a presentation module coupled to the database, the presentation module adapted for tailoring an output of the applications based on the updated profile information stored in the database and user requests for content and views; and a policy server coupled to the database, the application module, the network resource module, and the presentation module for controlling the operation of the telephony, messaging, and calendaring services thereof in accordance with policies identified utilizing the selected service class and updated profile information stored in the database, the policy server including a service logic execution program that executes a plurality of policies associated with each of the profiler module, the application module, the network resource module, and the presentation module.

2. The system as recited in claim 1, wherein the services are selected from the group consisting of Internet Protocol/Virtual Private Network (IP/VPN) services, Third Generation (3G) Wireless services, Voice over Internet Protocol (VoIP) services, and Application Service Provider (ASP) services.

3. The system as recited in claim 1, wherein the database includes a directory schema.

4. The system as recited in claim 3, wherein the directory schema includes an object-oriented structure.

5. The system as recited in claim 3, wherein the directory schema identifies a logical relationship between the user, devices utilized by the user, services associated with the user, and functionality of the services.

6. The system as recited in claim 3, wherein the presentation module includes directory interfaces for interfacing the directory schema.

7. The system as recited in claim 1, wherein the profile information includes service attributes associated with the user.

8. The system as recited in claim 7, wherein the service attributes indicates a type of service associated with the user.

9. The system as recited in claim 7, wherein the service attributes indicates a class of service associated with the user.

10. The system as recited in claim 7, wherein the application module allocates the application resources based on the service attributes collected by the profiler module.

11. The system as recited in claim 1, wherein the profiler module is executed on a portal server for collecting the profile information.

12. The system as recited in claim 1, wherein the application module includes JAVA code.

13. The system as recited in claim 1, wherein the application program interfaces of the application module interfaces a first application with a second application.

14. The system as recited in claim 1, wherein the network resource module is written in a scripting language.

15. The system as recited in claim 1, wherein the presentation module includes style sheets executed on a portal server.

16. The system as recited in claim 1, wherein the presentation module manages a plurality of presentation views that are utilized to tailor the output of the applications based on the profile information.

17. The system as recited in claim 1, wherein the presentation views include different views and fonts.

18. The system as recited in claim 1, wherein the network resource module enforces attributes of the selected service class and dynamically manages network bandwidth and quality of service based on the profile information stored in the database.

19. A service control method for providing intention-based, context-sensitive services to mobile users, comprising:

providing a database;

collecting a state of a user along with profile information utilizing a profiler module coupled to the database, wherein the profile information including identity, location, available services per location, devices per location, and security per location, wherein the profiler module;

evaluates inputs related to the profile information to create an evaluation, updates the profile information to include the evaluation, and updates attributes in the profile information for a type of service including telephony, messaging, and calendaring, updates attributes in the profile information for a selected service class related to an amount of service, and communicates the updated profile information to the database for storage therein;

interfacing with a plurality of applications utilizing an application module coupled to the database and including a plurality of application program interfaces, the application program interfaces including telephony, messaging, and calendaring interfaces, wherein the application module is adapted for allocating application resources to the applications based on the updated profile information stored in the database;

configuring a plurality of network routers based on the updated profile information stored in the database and the application resources allocated to the applications utilizing a network resource module coupled to the database and the network routers;

tailoring an output of the applications based on the updated profile information stored in the database and user requests for content and views utilizing a presentation module coupled to the database; and controlling the operation of the database, the application module, the network resource module, and the presentation module in accordance with policies identified utilizing the selected service class and the updated profile information stored in the database utilizing a policy server coupled thereto, including executing, via a service logic execution program, a plurality of policies associated with each of the profiler module, the application module, the network resource module, and the presentation module.

20. The method as recited in claim 19, wherein the services are selected from the group consisting of Internet Protocol/Virtual Private Network (IP/VPN) services, Third Generation (3G) Wireless services, Voice over Internet Protocol (VoIP) services, and Application Service Provider (ASP) services.

21. The method as recited in claim 19, wherein the database includes a directory schema.

22. The method as recited in claim 21, wherein the directory schema includes an object-oriented structure.

23. The method as recited in claim 21, wherein the directory schema identifies a logical relationship between the user, devices utilized by the user, services associated with the user, and functionality of the services.

24. The method as recited in claim 21, wherein the presentation module includes directory interfaces for interfacing the directory schema.

25. The method as recited in claim 19, wherein the profile information includes service attributes associated with the user.

26. The method as recited in claim 25, wherein the service attributes indicates a type of service associated with the user.

27. The method as recited in claim 25, wherein the service attributes indicates a class of service associated with the user.

28. The method as recited in claim 25, wherein the application module allocates the application resources based on the service attributes collected by the profiler module.

29. The method as recited in claim 19, wherein the profiler module is executed on a portal server for collecting the profile information.

30. The method as recited in claim 19, wherein the application module includes JAVA code.

31. The method as recited in claim 19, wherein the application program interfaces of the application module interfaces a first application with a second application.

32. The method as recited in claim 19, wherein the network resource module is written in a scripting language.

33. The method as recited in claim 19, wherein the presentation module includes style sheets executed on a portal server.

34. The method as recited in claim 19, wherein the presentation module manages a plurality of presentation views that are utilized to tailor the output of the applications based on the profile information.

35. The method as recited in claim 19, wherein the presentation views include different views and fonts.

36. The method as recited in claim 19, wherein the network resource module enforces attributes of the selected service class and dynamically manages network bandwidth and quality of service based on the profile information stored in the database.

37. A service control method, comprising:
   maintaining a database;
   collecting a state of a user along with profile information including identity, location, available services per location, devices per location, and security per location, and including attributes for a type of service including telephony, messaging, and calendaring and attributes for a selected service class related to an amount of service;
   updating the profile information to produce updated profile information by:
      evaluating inputs related to the profile information,
      updating attributes in the profile information for a type of service including telephony, messaging, and calendaring, and
      updating attributes in the profile information for a selected service class related to an amount of service
   communicating the updated profile information to the database for storage therein;
   allocating application resources to the applications based on the updated profile information stored in the database;
   configuring a plurality of network routers based on the updated profile information stored in the database and the application resources allocated to the applications;
   tailoring an output of the applications based on the updated profile information and user requests for content and views; and
   controlling the collecting, communicating, allocating, configuring, and tailoring in accordance with the selected service class and policies identified utilizing the profile information, including executing, via a service logic execution program, a plurality of policies associated with each of the collecting, communicating, allocating, configuring, and tailoring.

38. A service control system, comprising:
   means for maintaining a database;
   means for collecting a state of a user along with profile information including identity, location, available services per location, devices per location, and security per location;
   means for evaluating inputs related to the profile information and updating attributes in the profile information for a type of service including telephony, messaging, and calendaring and updating attributes in the profile information for a selected service class related to an amount of service, wherein the means for evaluating inputs and updating attributes is operably coupled to the means for collecting a state of a user;
   means for updating the profile information to produce updated profile information based on evaluating inputs and the updating of attributes in the profile information for a type of service and for a selected service class, wherein the means for updating the profile information is operably coupled to the means for evaluating inputs and updating attributes;
   means for communicating the updated profile information to the database for storage therein;
   means for allocating application resources to the applications based on the updated profile information stored in the database;
   means for configuring a plurality of network routers based on the updated profile information stored in the database and the application resources allocated to the applications;
   means for tailoring an output of the applications based on user requests for content and views and the updated profile information; and
   means for controlling the collecting, communicating, updating, allocating, configuring, and tailoring in accordance with the selected service class and policies identified utilizing the updated profile information, including a service logic execution program that executes a plurality of policies associated with each of the means for collecting, communicating, updating, allocating, configuring, and tailoring.

39. A service control system for providing intention-based, context-sensitive services to mobile users, comprising:
   a database including a directory schema;
   a profiler module coupled to the database, wherein the profiler module:
   collects a state of a user along with profile information including identity, location, available services per location, devices per location, and security per location,
      evaluates inputs related to the profile information to create an evaluation,
      updates the profile information to include the evaluation,
      updates attributes in the profile information for a type of service including telephony, messaging, and calendaring,
      updates attributes in the profile information for a selected service class related to an amount of service, and
      communicates the updated profile information to the database for storage therein;
   an application module coupled to the database and including a plurality of application program interfaces for interfacing with a plurality of applications, the application program interfaces including telephony, messaging, and calendaring interfaces, wherein the application module is adapted for allocating application resources to the applications based on the updated profile information stored in the database;

a network resource module coupled to the database and a plurality of network routers, the network resource module adapted for configuring the network routers based on the updated profile information stored in the database and the application resources allocated to the applications;

a presentation module coupled to the database, the presentation module adapted for tailoring an output of the applications based on the updated profile information stored in the database and user requests for content and views, wherein the presentation module manages a plurality of presentation views that are utilized to tailor the output of the applications based on the updated profile information; and a policy server coupled to the database, the application module, the network resource module, and the presentation module for controlling the operation of the telephony, messaging, and calendaring services thereof in accordance with the selected service class and policies identified utilizing the updated profile information stored in the database, the policy server including a service logic execution program that executes a plurality of policies associated with each of the profiler module, the application module, the network resource module, and the presentation module;

wherein the system provides services including Internet Protocol/Virtual Private Network (IP/VPN) services, Third Generation (3G) Wireless services, Voice over Internet Protocol (VoIP) services, and Application Service Provider (ASP) services.

40. The system as recited in claim 39, wherein the network resource module enforces attributes of the selected service class and dynamically manages network bandwidth and quality of service based on the profile information stored in the database.

* * * * *

UNITED STATES PATENT AND TRADEMARK OFFICE
CERTIFICATE OF CORRECTION

PATENT NO. : 7,716,333 B2 Page 1 of 1
APPLICATION NO. : 10/306979
DATED : May 11, 2010
INVENTOR(S) : Michel K. Bowman-Amuah It is certified that error appears in the above-identified patent and that said Letters Patent is hereby corrected as shown below:

Claim 19, col. 12, lines 12-13, "wherein the profiler module;" should read -- wherein the profiler module: --.

Signed and Sealed this

Thirteenth Day of July, 2010

David J. Kappos
*Director of the United States Patent and Trademark Office*